(12) United States Patent
Chen (10) Patent No.: US 10,608,521 B2
(45) Date of Patent: Mar. 31, 2020

(54) PASSIVE CIRCUIT AND POWER CONVERTER

(71) Applicant: DELTA ELECTRONICS, INC., Taoyuan (TW)

(72) Inventor: Yang-Lin Chen, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 16/052,588

(22) Filed: Aug. 1, 2018

(65) Prior Publication Data

US 2019/0181742 A1 Jun. 13, 2019

(30) Foreign Application Priority Data

Dec. 8, 2017 (CN) .......................... 2017 1 1292085

(51) Int. Cl.
*H02M 3/158* (2006.01)
*H02M 1/08* (2006.01)
*H02M 1/00* (2006.01)
*H02M 7/219* (2006.01)
*H01F 30/06* (2006.01)

(52) U.S. Cl.
CPC ............ *H02M 1/083* (2013.01); *H01F 30/06* (2013.01); *H02M 3/158* (2013.01); *H02M 7/219* (2013.01); *H02M 2001/0058* (2013.01)

(58) Field of Classification Search
CPC ...... H02M 3/158; H02M 1/083; H02M 7/219; H02M 2001/0058; H02M 2001/0067; H02M 2001/007; H01F 30/06
USPC .................................................. 323/222, 225
See application file for complete search history.

(56) References Cited

U.S. PATENT DOCUMENTS

| | | | |
|---|---|---|---|
| 8,125,205 B2 | 2/2012 | Chandrasekaran et al. | |
| 8,723,487 B2 | 5/2014 | Pahlevaninezhad et al. | |
| 8,743,575 B2* | 6/2014 | Nymand ............... | H02M 3/335 363/17 |
| 9,106,130 B2* | 8/2015 | Chandrasekaran ... | H02M 3/156 |
| 9,601,262 B2* | 3/2017 | Ye .......................... | H02M 7/487 |
| 2006/0187684 A1* | 8/2006 | Chandrasekaran ........................ | H02M 3/33592 363/16 |
| 2006/0197510 A1* | 9/2006 | Chandrasekaran . | H02M 3/1588 323/222 |

(Continued)

OTHER PUBLICATIONS

M. Pahlevaninezhad, P. Das, J. Drobnik, P. K. Jain and A. Bakhshai, "A ZVS Interleaved Boost AC/DC Converter Used in Plug-in Electric Vehicles," in IEEE Transactions on Power Electronics, vol. 27, No. 8, pp. 3513-3529, Aug. 2012.

*Primary Examiner* — Gary L Laxton
*Assistant Examiner* — Sisay G Tiku
(74) *Attorney, Agent, or Firm* — CKC & Partners Co., LLC (57) ABSTRACT

A passive circuit includes a first inductance unit, a second inductance unit, a third inductance unit, and a fourth inductance unit which are coupled to each other, and a capacitance unit. A first end of the first inductance unit is coupled to a first end of the second inductance unit, and a second end of the first inductance unit is coupled to a first end of the third inductance unit. A second end of the second inductance unit is coupled to a first end of the fourth inductance unit. A second end of the third inductance unit and a second end of the fourth inductance unit are respectively coupled to the capacitance unit.

18 Claims, 10 Drawing Sheets

(56) References Cited

U.S. PATENT DOCUMENTS

| | | | |
|---|---|---|---|
| 2007/0279022 A1* | 12/2007 | Chen | H02M 3/1584 323/272 |
| 2008/0054874 A1* | 3/2008 | Chandrasekaran | H01F 37/00 323/362 |
| 2008/0150666 A1* | 6/2008 | Chandrasekaran | H01F 3/14 336/182 |
| 2008/0224812 A1* | 9/2008 | Chandrasekaran | H01F 27/38 336/212 |
| 2010/0254168 A1* | 10/2010 | Chandrasekaran | H01F 3/10 363/37 |
| 2013/0038130 A1* | 2/2013 | Lai | H02M 7/487 307/80 |
| 2013/0235631 A1* | 9/2013 | Pahlevaninezhad | H02M 1/42 363/126 |
| 2013/0257410 A1* | 10/2013 | Gardner | H01G 11/04 323/355 |
| 2017/0294833 A1* | 10/2017 | Yang | H01F 27/2804 |
| 2017/0373601 A1* | 12/2017 | Ahmed | H02M 3/155 |
| 2018/0076723 A1* | 3/2018 | Li | H02M 3/3378 |

* cited by examiner

PASSIVE CIRCUIT AND POWER CONVERTER

RELATED APPLICATIONS

This application claims priority to China Application Serial Number 201711292085.5, filed Dec. 8, 2017, which is herein incorporated by reference.

BACKGROUND

Technical Field

The present disclosure relates to a passive circuit, and in particular, to a passive circuit arranged in a power converter.

Description of Related Art

As the development of power electronics, the switching power converter circuits are widely applied to various power converter devices. As the development trend of high frequency, for decreasing switching loss and increasing power efficiency, an important area of research in the field involves ways in implementation of the zero voltage switching of switches.

SUMMARY

One aspect of the present disclosure is a passive circuit. The passive circuit includes a first inductance unit, a second inductance unit, a third inductance unit, a fourth inductance unit, and a capacitance unit. The first inductance unit, the second inductance unit, the third inductance unit, and the fourth inductance unit are coupled to each other, a first end of the first inductance unit is coupled to a first end of the second inductance unit, a second end of the first inductance unit is coupled to a first end of the third inductance unit, a second end of the second inductance unit is coupled to a first end of the fourth inductance unit, and a second end of the third inductance unit and a second end of the fourth inductance unit are respectively coupled to the capacitance unit.

Another aspect of the present disclosure is a power converter. The power converter includes a passive circuit and a switching circuit. The passive circuit includes a first inductance unit, a second inductance unit, a third inductance unit, a fourth inductance unit, and a capacitance unit coupled to each other. A first end of the first inductance unit is coupled to a first end of the second inductance unit, a second end of the first inductance unit is coupled to a first end of the third inductance unit, a second end of the second inductance unit is coupled to a first end of the fourth inductance unit, a second end of the third inductance unit and a second end of the fourth inductance unit are respectively coupled to the capacitance unit. The switching circuit is coupled to the passive circuit, and the switching circuit includes switches configured to be selectively on or off to convert a first voltage to a second voltage.

Yet another aspect of the present disclosure is a power converter. The power converter includes multiple passive circuits and multiple switching circuits. The passive circuits are respectively configured to receive a corresponding one of input ac phase voltages. The switching circuits are electrically coupled to a corresponding one of the passive circuits respectively, and DC output terminals of the switching circuits are electrically coupled to each other. Each of the passive circuits includes a first inductance unit, a second inductance unit, a third inductance unit, a fourth inductance unit and a capacitance unit coupled to each other, a first end of the first inductance unit coupled with a first end of the second inductance, a second end of the first inductance unit coupled with a first end of the third inductance unit, a second end of the second inductance unit coupled with a first end of the fourth inductance unit, and a second end of the third inductance unit and a second end of the fourth inductance unit respectively coupled with the capacitance unit.

BRIEF DESCRIPTION OF THE DRAWINGS

The disclosure can be more fully understood by reading the following detailed description of the embodiments, with reference made to the accompanying drawings as follows.

DETAILED DESCRIPTION

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

The terms used in this specification and claims, unless otherwise stated, generally have their ordinary meanings in the art, within the context of the disclosure, and in the specific context where each term is used. Certain terms that are used to describe the disclosure are discussed below, or elsewhere in the specification, to provide additional guidance to the practitioner skilled in the art regarding the description of the disclosure.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other. It will be understood that, although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments.

Figure 1:
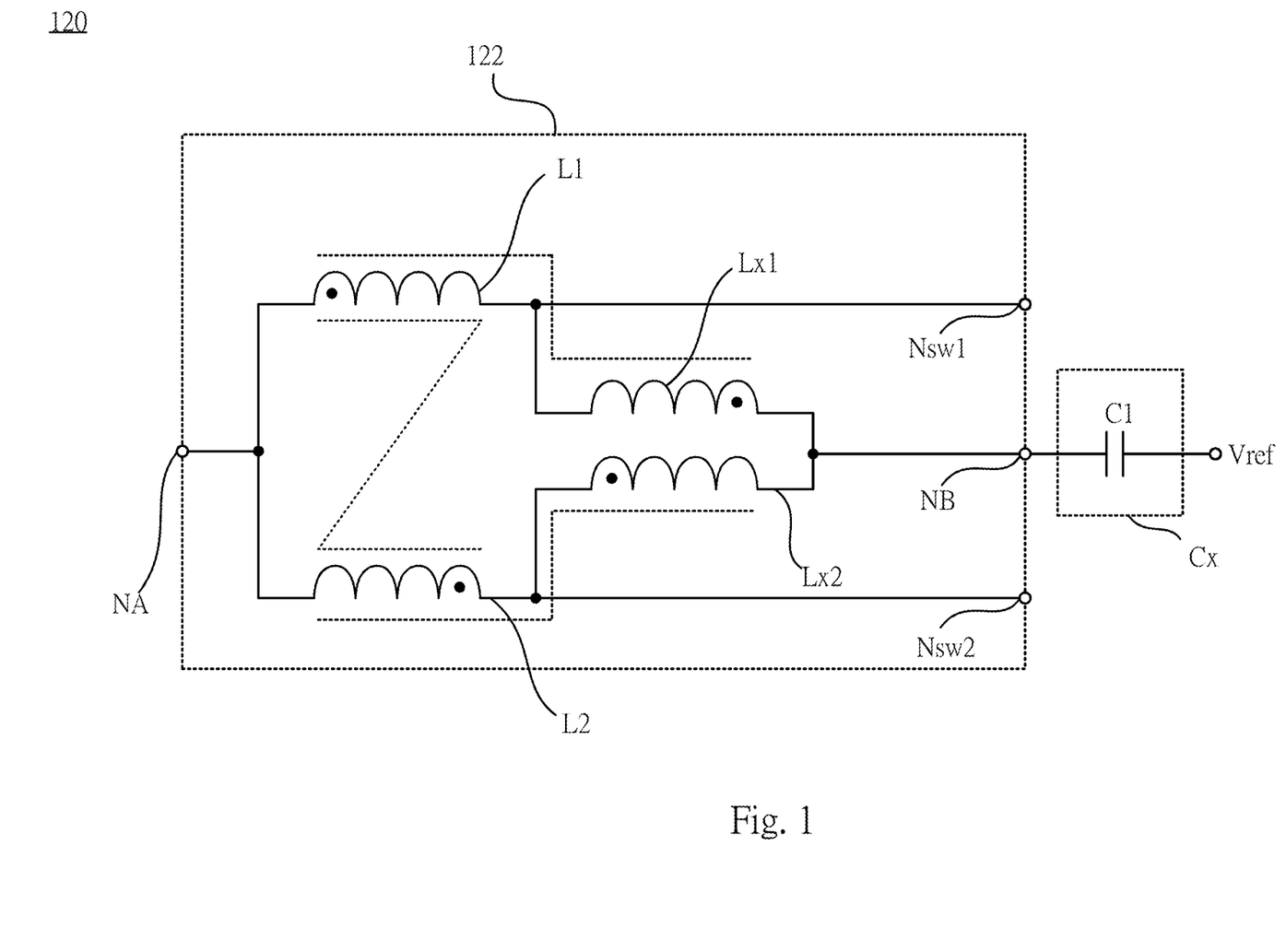
FIG. 1 is a diagram illustrating a passive circuit according to some embodiments of the present disclosure.

Please refer to FIG. 1. FIG. 1 is a diagram illustrating a passive circuit 120 according to some embodiments of the present disclosure. According to the FIG. 1, the passive circuit 120 includes an inductive structure 122 and a capacitance unit Cx. In some embodiments, the inductive structure 122 includes inductance units L1, L2, Lx1, and Lx2 coupled to each other.

A first end of the inductance unit L1 (e.g., the dotted terminal) is coupled to a first end of inductance unit L2 (e.g., the undotted terminal) and a node NA of the inductive structure 122. A second end of the inductance unit L1 (e.g., the undotted terminal) is coupled to a first end of inductance unit Lx1 (e.g., the undotted terminal) and a node Nsw1 of the inductive structure 122. A second end of the inductance unit L2 (e.g., the dotted terminal) is coupled to a first end of inductance unit Lx2 (e.g., the dotted terminal) and a node Nsw2 of the inductive structure 122. A second end of the inductance unit Lx1 (e.g., the dotted terminal) and a second end of the inductance unit Lx2 (e.g., the undotted terminal) are respectively electrically coupled to the capacitance unit Cx through a node NB of the inductive structure 122. Therefore, the capacitance unit Cx may be configured to adjust the current to absorb or provide extra current on the condition that the current of the inductance unit Lx1 and the current of inductance unit Lx2 are different.

In some embodiments, the capacitance unit Cx includes a first capacitor C1. The second end of the inductance unit Lx1 and the second end of the inductance unit Lx2 are coupled to each other and commonly electrically coupled to a first end of the first capacitor C1. A second end of the first capacitor C1 is configured to receive a reference voltage Vref. For instance, the second end of the first capacitor C1 may be coupled to the ground, but the present disclosure is not limited thereto. In some other embodiments, based on different requirements, the capacitance unit Cx may also include multiple capacitors coupled in series or parallel so FIG. 1 is simply an example and not meant to limit the present disclosure.

Figure 2:
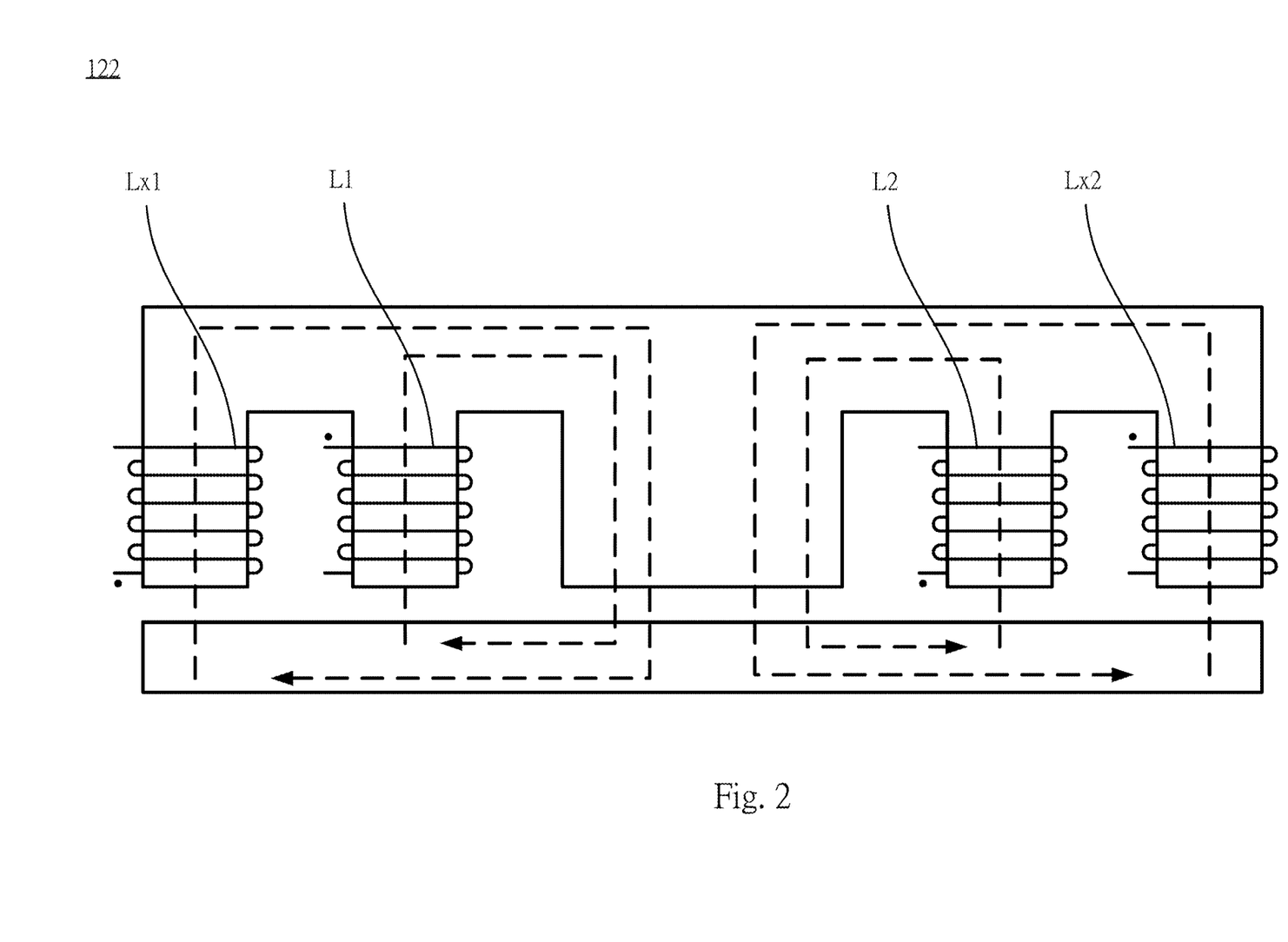
FIG. 2 is a diagram illustrating an inductive structure according to some embodiments of the present disclosure.

Specifically, in some embodiments, the inductance units L1, L2, Lx1, and Lx2 are integrated on a magnetic core. Please refer to FIG. 2. FIG. 2 is a diagram illustrating the inductive structure 122 according to some embodiments of the present disclosure. According to FIG. 2, in some embodiments, the inductive structure 122 may be implemented by the five-post magnetic core. The inductance units L1 and L2 are implemented by the N windings on the corresponding magnetic post. The inductance units Lx1 and Lx2 are implemented by the Nx windings on the corresponding magnetic post. As shown in FIG. 2, by the above structure, the magnetic flux produced by four magnetic posts having windings could flow through the magnetic post without winding. Then, the magnetic flux flows back to the original magnetic post to form a closed loop; consequently, the coupling of the inductance units L1, L2, Lx1 and Lx2 is realized.

It is noted that, the number of windings of the inductance units L1, L2, Lx1 and Lx2 may be designed by actual requirements. In other words, the number of windings of the inductance units Lx1, Lx2 may be greater than, less than or equal to the number of windings of the inductance units L1, L2. In addition, the ratio relationship between the cross section area of each magnetic post and the length of air gap may be designed by actual requirements. In other words, the cross section area of each magnetic post may be equivalent or different, and the length of air gap corresponding to each magnetic post may be zero or any length. Therefore, the equivalent magnetic resistance value of each magnetic post may be determined by the cross section area, the length of air gap, and characteristic of materials of the magnetic posts. Due to the relevant of the current passing through the inductance units L1, L2, Lx1, and Lx2 and the equivalent magnetic resistance value, the equivalent magnetic resistance value on the magnetic post may be adjusted by design parameters of air gap length, cross section area, etc. so that the peak value of each current passing through the inductance units L1, L2 and the inductance units Lx1, Lx2 may be controlled.

In some other embodiments, the inductive structure 122 may be also be implemented by different structure of five-post magnetic core. For instance, the four groups of magnetic columns having windings may be arranged in rectangular order, and the magnetic post without winding may be arranged at a central position which is at equal distance from the four groups of magnetic posts. Accordingly, the structure of coupling inductance illustrated in FIG. 2 is simply one of the possible embodiments of this disclosure and not meant to limit the present disclosure.

The passive circuit 120 and the inductive structure 122 illustrated in FIG. 1 and FIG. 2 are applicable in various switching power converters. By designing the values of current respectively passing through each inductance units L1, L2 and inductance units Lx1, Lx2, the zero voltage switching of switches in the power converters may be implemented. For better understanding, the operations of the passive circuit 120 in the power converter will be discussed in the following paragraphs in accompanying with the drawing.

Figure 3:
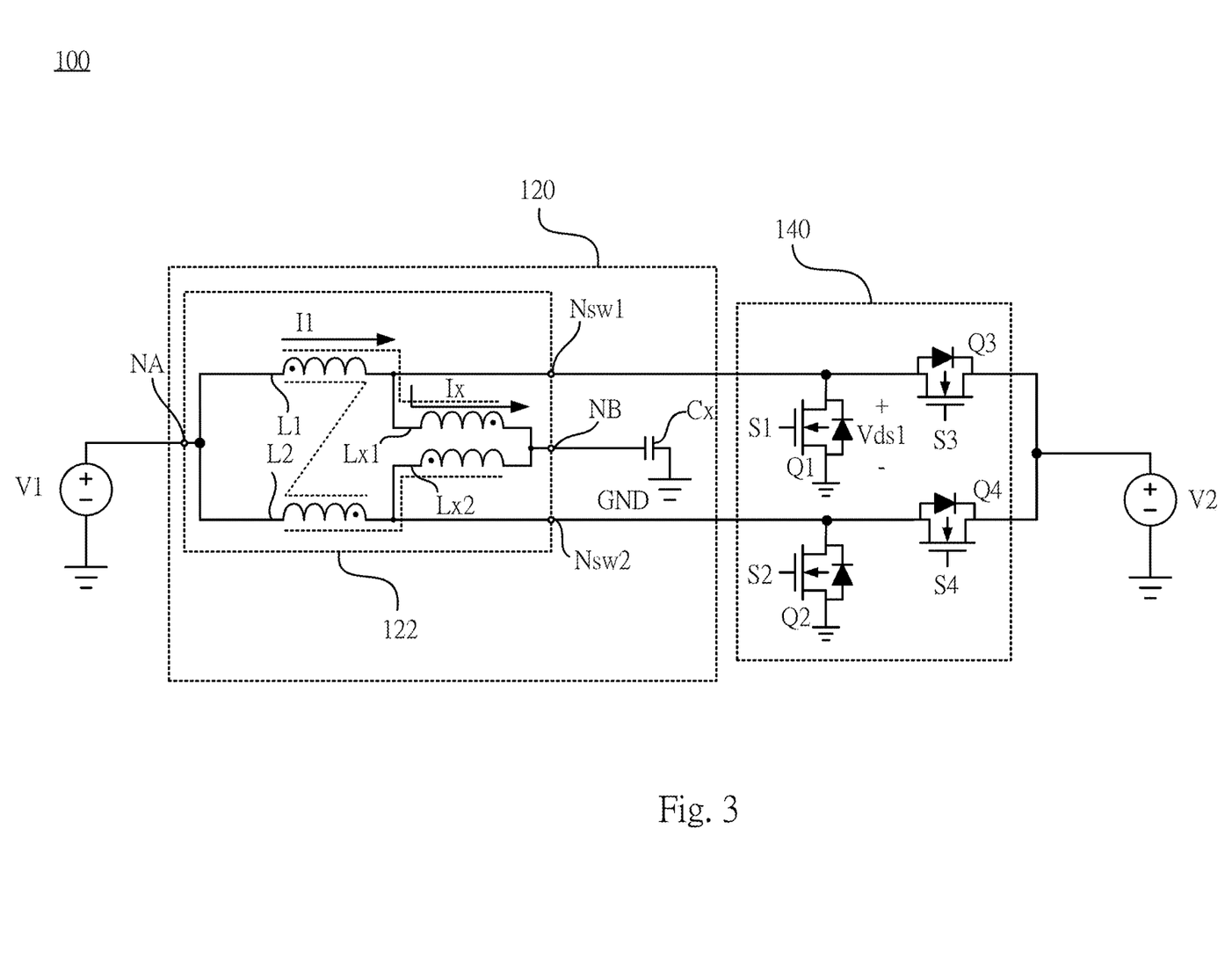
FIG. 3 is a diagram illustrating a power converter according to some embodiments of the present disclosure.

Please refer to FIG. 3. FIG. 3 is a diagram illustrating the power converter 100 according to some embodiments of the present disclosure. As shown in FIG. 3, the power converter 100 in some embodiments may be a boost, a buck, or a buck-boost converter.

The power converter 100 includes a passive circuit 120 and a switching circuit 140. The switching circuit 140 is electrically coupled to the passive circuit 120, in which the switching circuit 140 includes switches Q1~Q4. The switches Q1~Q4 are selectively on or off according to the control signals S1~S4 respectively to convert the DC voltage V1 to the DC voltage V2.

In the embodiments shown in FIG. 3, a node NA in the inductive structure 122 is configured to receive or provide the DC voltage V1, and a node NB in the inductive structure 122 is electrically coupled to the first end of the capacitance unit Cx. The second end of the capacitance unit Cx is electrically coupled to the ground terminal and configured to receive a reference voltage GND. The nodes Nsw1 and Nsw2 of the inductive structure 122 are respectively coupled to the switches Q1, Q3 and the switches Q2, Q4 in the switching circuit 140.

The switches Q1, Q3 of the switching circuit 140 are electrically coupled to the second end of the inductance unit L1 and the first end of inductance unit Lx1 via the node Nsw1. The switches Q2, Q4 of the switching circuit 140 are electrically coupled to the second end of the inductance unit L2 and the first end of the inductance unit Lx2 via the node Nsw2.

Specifically, the first end of the switch Q1 is coupled to the second end of the inductance unit L1, and the second end of the switch Q1 is coupled to the reference voltage GND (i.e., the ground terminal). The first end of the switch Q2 is coupled to the second end of the inductance unit L2, and the second end of the switch Q2 is coupled to the reference voltage GND (i.e., the ground terminal). The first end of the switch Q3 is coupled to the first end of the switch Q1, and the first end of the switch Q4 is coupled to the first end of the switch Q2. The second end of the switch Q3 and the second end of the switch Q4 are coupled to each other and configured to receive or provide the DC voltage V2.

Thus, by the co-operation of the passive circuit 120 and the switching circuit 140, the power converter 100 is able to receive the DC voltage V1 through the first end of the inductance unit L1, and after the voltage conversion, provide and output the corresponding DC voltage V2 through the second end of the switch Q3 and the second end of the switch Q4. In the reverse direction, the power converter 100 is also able to receive the DC voltage V2 through the second end of the switch Q3 or the second end of the switch Q4, and after the voltage conversion, output the DC voltage V1 through the first end of the inductance unit L1. Therefore, the power converter 100 may achieve the boost or buck operation of the power supply.

Figure 4A:
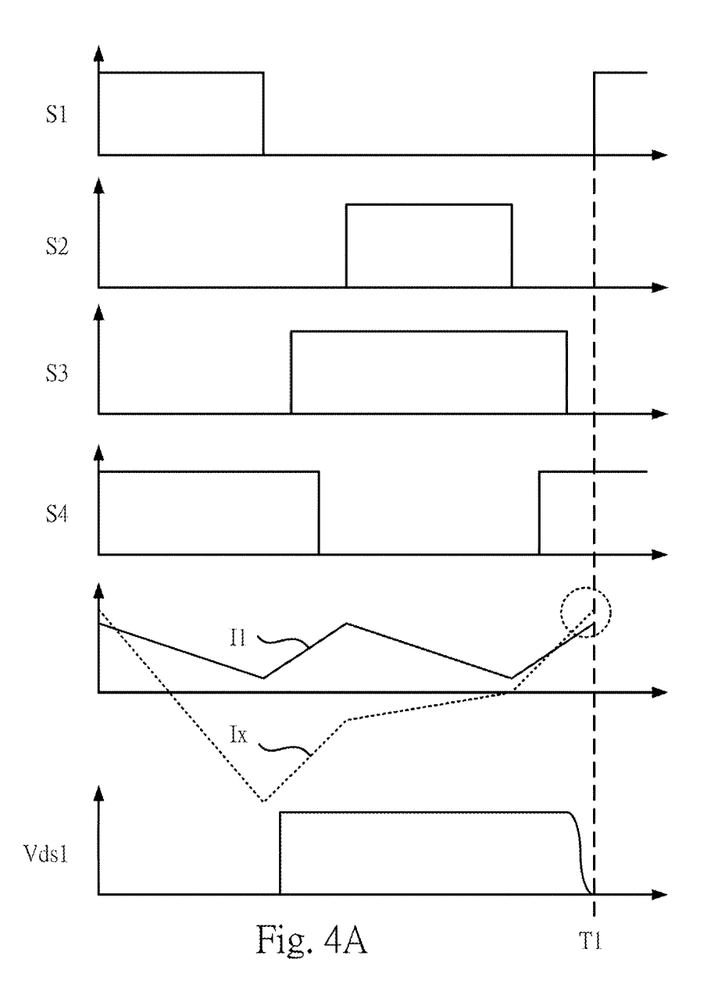
FIG. 4A and FIG. 4B are waveform diagrams illustrating operations of the power converter shown in FIG. 3 under an interleaved control mode according to some embodiments of the present disclosure.
Figure 4B:
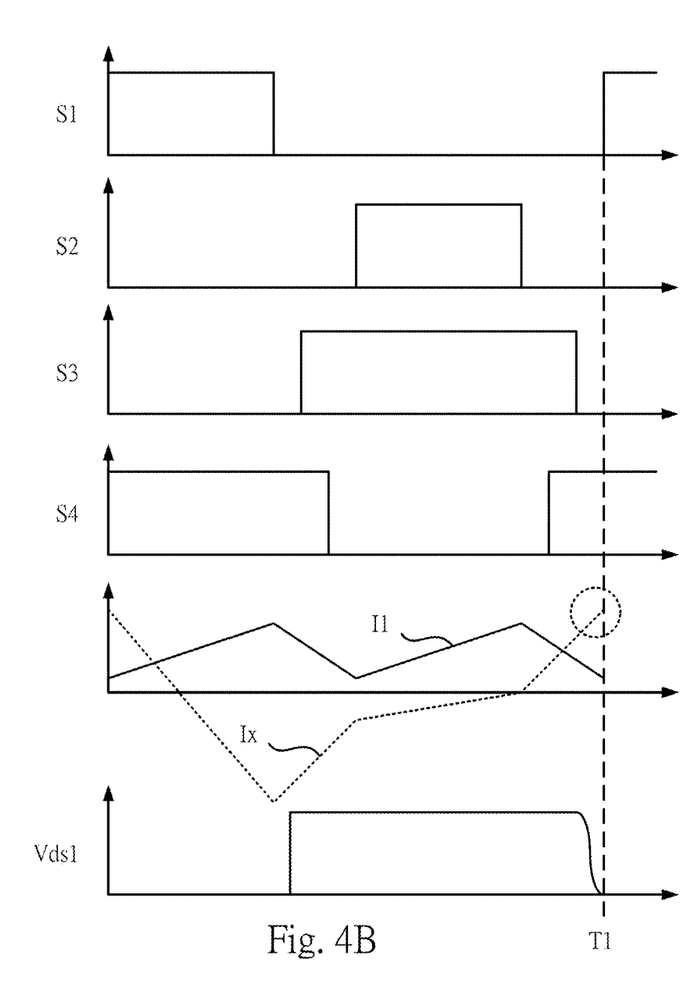

In various embodiments, the switches Q1~Q4 in the switching circuit 140 may be operated in an interleaved control mode or a synchronized control mode based on the actual requirements. Please refer to FIG. 4A and FIG. 4B. FIG. 4A and FIG. 4B are waveform diagrams illustrating operations of the power converter 100 shown in FIG. 3 under the interleaved control mode according to some embodiments of the present disclosure.

As shown in FIG. 4A and FIG. 4B, in the interleaved control mode, when the switch Q1 is off as the control signal S1 changed from an enable level to a disable level, after the deadtime, the control signal S3 in the same group is switched from the disable level to the enable level so that the switch Q3 is turned on. Similarly, when the switch Q2 is off as after the control signal S2 changed from the enable level to the disable level, after the deadtime, the control signal S4 in the same group is switched from the disable level to the enable level so that the switch Q4 is turned on. In a complete period, the current I1 which passes through the inductance unit L1 changes periodically between its peak and trough. The periodical change is demonstrated as the waveform shown in FIG. 4A or in FIG. 4B.

As the time point T1 marked in FIG. 4A and FIG. 4B, before the switch Q1 switches from off to on according to the control signal S1, the current Ix passing through the inductance unit Lx1 is greater than the current L1 passing through the inductance unit L1. As depicted in the dotted circle marked in the figure, when the current Ix passing through the inductance unit Lx1 is greater than the current I1 passing through inductance unit L1, the current passes through a forward parasitic diode in the switch Q1 to achieve the current balance on the node Nsw1. In other words, the voltage Vds1 between two terminals of the switch Q1 is forced to lower to zero voltage.

By the appropriate design of relative parameters of the inductance units L1~Lx2, the current Ix passing through the inductance unit Lx1 may be designed to be greater than the current I1 of inductance unit L1 before the control signal S1 enables the switch Q1 to be conduction. Therefore, the voltage Vds1 between the two terminals of the switch Q1 may be decreased to zero before the conduction of the switch Q1 (i.e., before T1) to realize the zero voltage switching of the switch Q1. Similarly, the zero voltage switching of switch Q2 may be realized by similar design, and further explanations are omitted herein for the sake of brevity.

It is noted that although the waveforms under the interleaved control mode in FIG. 4A and FIG. 4B are taken as examples, the present disclosure is not limited thereto. In other words, when the power converter 100 in FIG. 3 is operated under the synchronized control mode, by designing the current Ix passing through the inductance unit Lx1 to be greater than the current I1 of inductance unit L1 before the control signal S1 enables the switch Q1 to be conduction, the voltage Vds1 between the two terminals of the switch Q1 may be decreased to zero before the conduction of the switch Q1 (i.e., before T1) to achieve the zero voltage switching of the switch Q1. One skilled in the art can understand the operations thereof and thus further explanations are omitted herein for the sake of brevity.

Furthermore, in some other embodiments, the passive circuit 120 may also be arranged in other types of the power converter 100 in order to implement the zero voltage switching of the switching circuit 140.

Figure 5A:
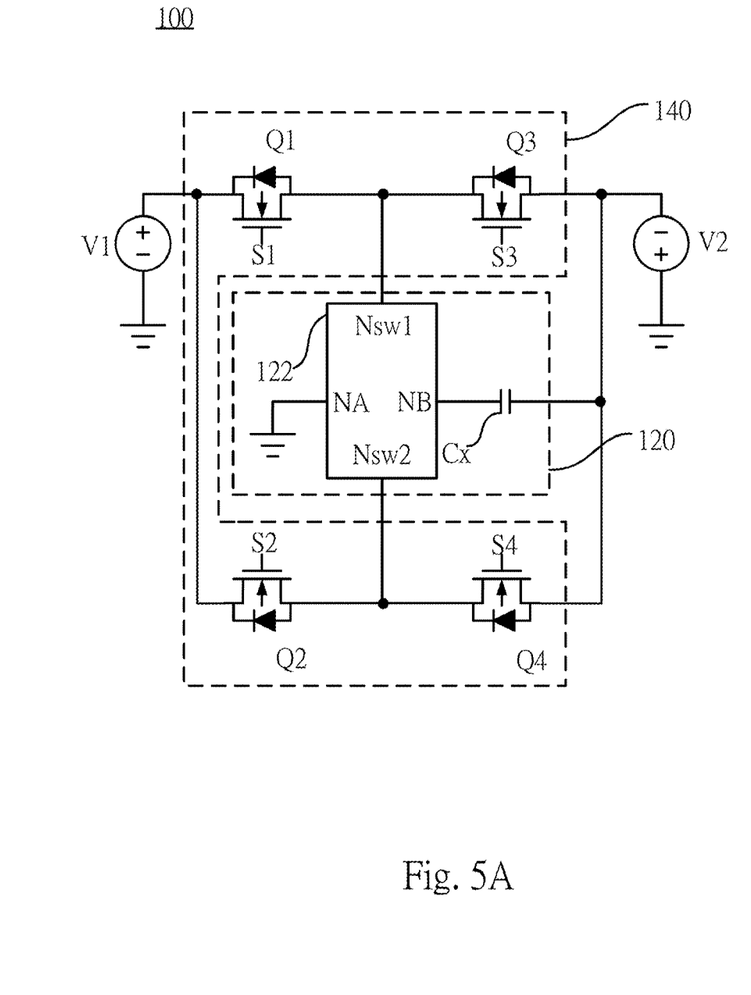
FIG. 5A and FIG. 5B are diagrams illustrating the power converter according to some other embodiments of the present disclosure.
Figure 5B:
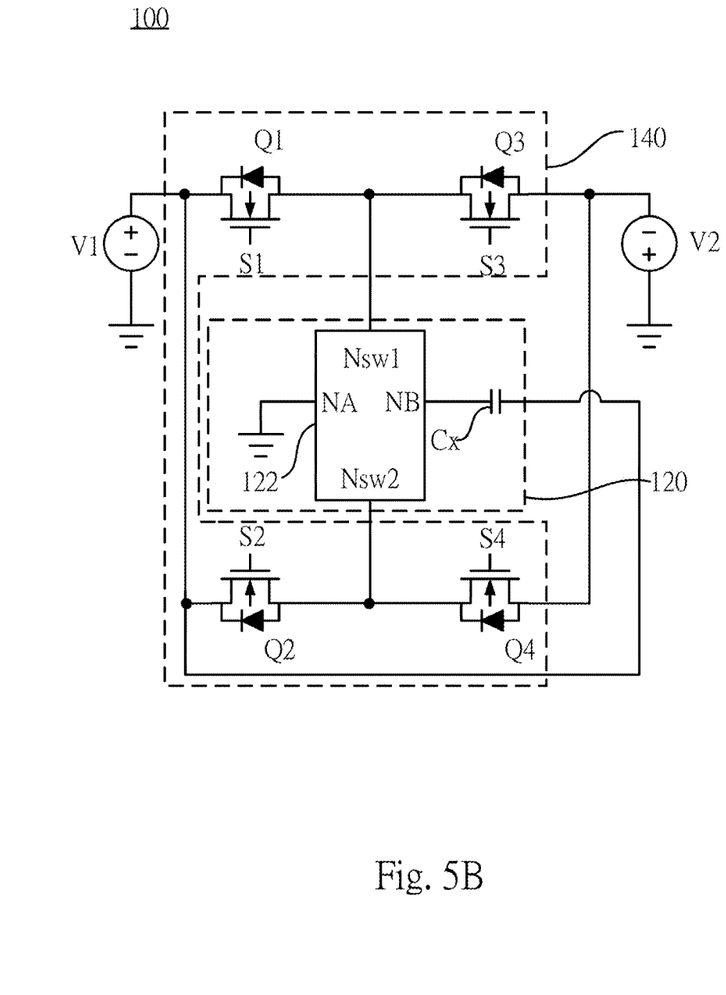

Please refer to the FIG. 5A and FIG. 5B. FIG. 5A and FIG. 5B are diagrams illustrating the power converter 100 according to some other embodiments of the present disclosure. As shown in FIG. 5A, in some embodiments, the node NA of the inductive unit 122 is electrically coupled to the ground terminal. In the power converter 140, the first end of the switch Q1 and the first end of the switch Q2 are coupled to each other and configured to receive or provide the DC voltage V1. The second end of the switch Q3 and the second end of the switch Q4 are coupled to each other and configured to receive or provide the DC voltage V2. The second end of the switch Q1 and the first end of the switch Q3 are electrically coupled to the node Nsw1 of the inductive structure 122. The second end of the switch Q2 and the first end of the switch Q4 are electrically coupled to the node Nsw2 of the inductive structure 122. The first end of capacitance unit Cx is electrically coupled to the node NB. The second end of capacitance unit Cx is coupled to the second end of the switch Q3 and the second end of the switch Q4.

Compare to the embodiments shown in the FIG. 5A, in the embodiments in the FIG. 5B, the second end of capacitance unit Cx is coupled to the first end of the switch Q1 and the first end of the switch Q2.

Thus, the passive circuit 120 in FIG. 1 may match various types of the switching circuits 140 in FIG. 5A and FIG. 5B and perform the Buck/Boost conversion of power and realize the zero voltage switching of the switches Q1~Q4.

Figure 6:
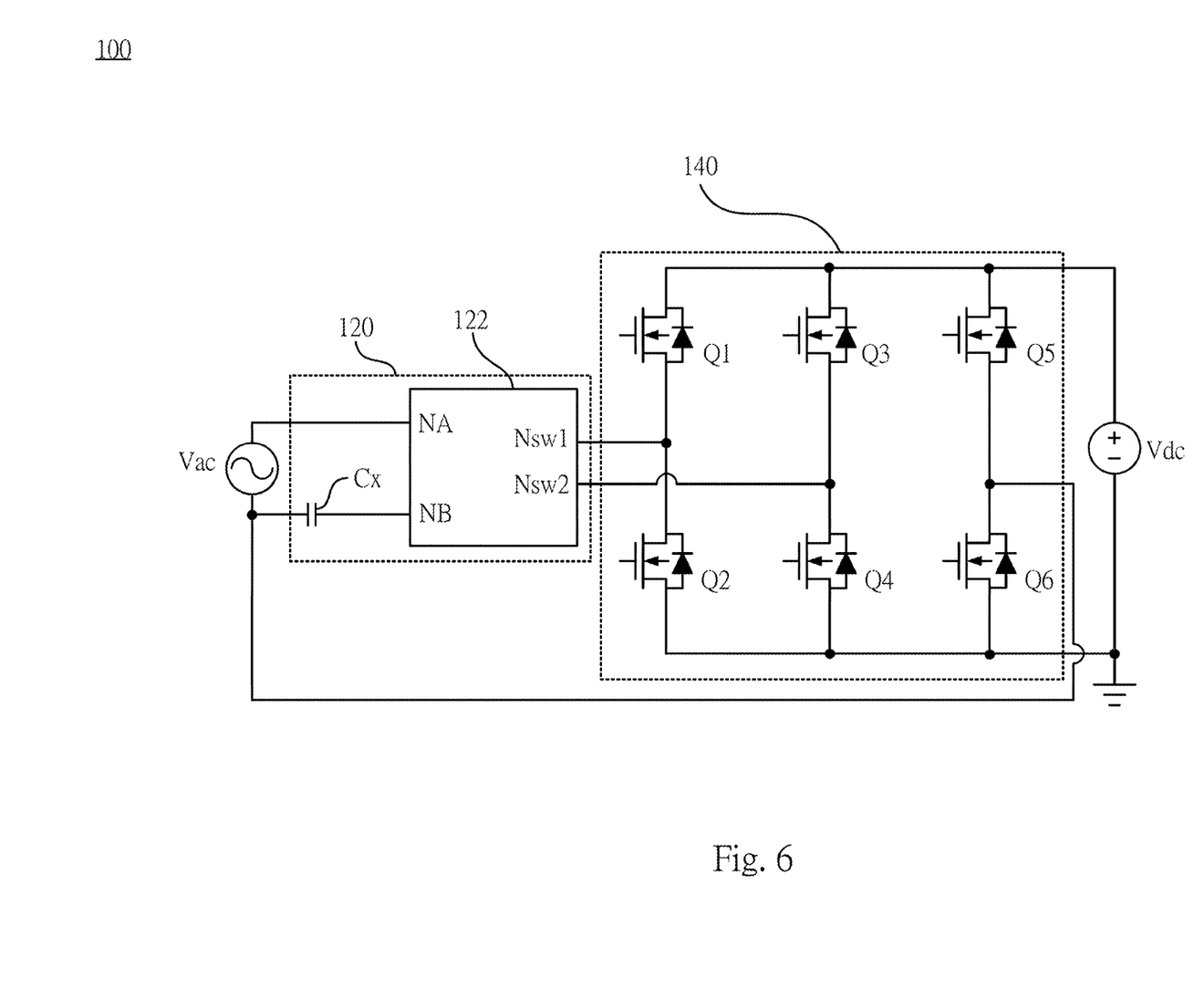
FIG. 6 is a diagram illustrating the power converter according to some other embodiments of the present disclosure.

Please refer to the FIG. 6. FIG. 6 is a diagram illustrating a power converter according to some other embodiments of the present disclosure. As shown in FIG. 6, in some embodiments, the power converter 100 may be a totem pole rectifier or inverter. As shown in FIG. 6, in some embodiments, the switching circuit 140 includes switches Q1, Q2, Q3, Q4, Q5, and Q6. The first ends of the switches Q1, Q3, and Q5 are coupled to each other and coupled to a positive end of the DC voltage Vdc. The second ends of the switches Q2, Q4, and Q6 are coupled to each other and coupled to a negative end of the DC voltage Vdc (e.g., the ground terminal).

The node Nsw1 of the inductive structure 122 (i.e., the second end of the inductance unit L1) is electrically coupled to the second end of the switch Q1 and the first end of the switch Q2. The node Nsw2 (i.e., the second end of inductance unit L2) is electrically coupled to the second end of the switch Q3 and the first end of the switch Q4. The node NA is electrically coupled to the first end of the AC voltage Vac, and the node NB is electrically coupled to the first end of the capacitance unit Cx. In other words, the second end of the inductance unit Lx1 and the second end of the inductance unit Lx2 are coupled to each other and commonly electrically coupled to the first end of the capacitance unit Cx. The second end of the capacitance unit Cx is electrically coupled to the second end of the switch Q5 and the first end of the switch Q6, and commonly electrically coupled to the second end of the AC voltage Vac.

Therefore, the passive circuit 120 in the FIG. 1 may match the totem-pole switching circuit 140 to perform the conversion between the AC power and the DC power and realize the zero voltage switching of the switches Q1~Q4.

Figure 7:
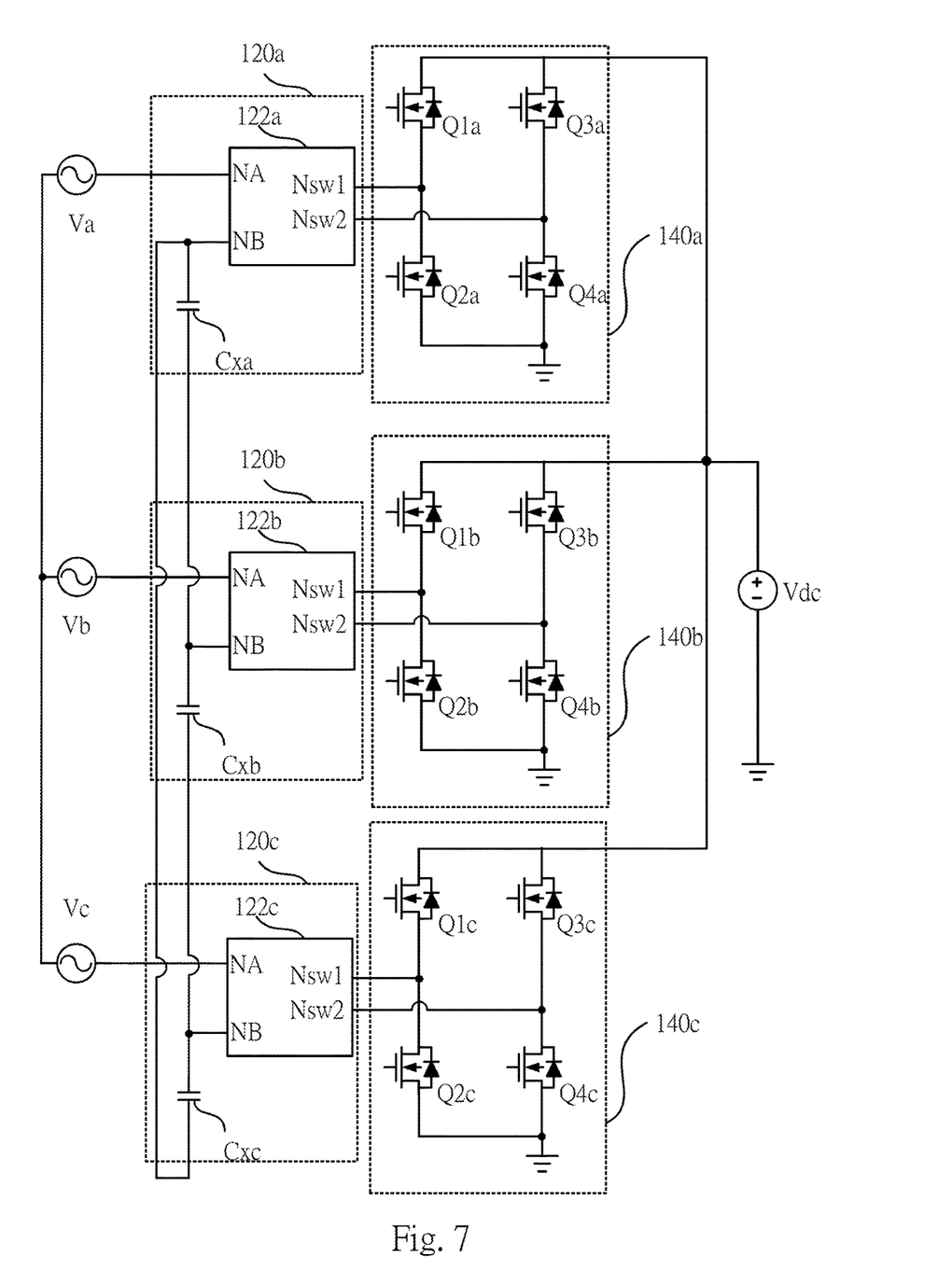
FIG. 7 is a diagram illustrating the power converter according to some embodiments of the present disclosure.

In addition, in some embodiments, the voltage conversion of multiphase (e.g., three phase) AC power may be implemented by multiple groups of passive circuits 120 and the switching circuits 140. Please refer to FIG. 7. FIG. 7 is a diagram illustrating a power converter according to some embodiments of the present disclosure. In some embodiments of FIG. 7, the power converter 100 includes multiple passive circuits 120a, 120b, 120c and corresponding switching circuits 140a, 140b, and 140c.

In the present embodiments, the passive circuits 120a, 120b, 120c of each phase are respectively configured to receive a corresponding one of the input AC phase voltages Va, Vb, Vc. Specifically, the passive circuits 120a, 120b, 120c of each phase respectively includes inductive structures 122a, 122b, 122c and the corresponding capacitance units Cxa, Cxb, Cxc. The capacitance units Cxa, Cxb, Cxc are coupled to each other. Specifically, the capacitance unit Cxa is coupled between the node NB of the inductive unit 122a and the node NB of the inductive unit 122b. The capacitance unit Cxb is coupled between the node NB of the inductive unit 122b and the node NB of the inductive unit 122c. The capacitance unit Cxc is coupled between the node NB of the inductive unit 122c and the node NB of the inductive unit 122a. The inductive units 122a, 122b, 122c may be respectively implemented by the inductive unit 122 shown in FIG. 1. In other words, in some embodiments, the inductance unit L1, the inductance unit L2, the inductance unit Lx1, and the inductance unit Lx2 in the same passive circuits 120a, 120b, 120c are integrated on a magnetic core. The details are discussed and illustrated in previous paragraphs, so the further explanations are omitted herein for the sake of brevity.

The switching circuits 140a, 140b, 140c are respectively electrically coupled to one of the corresponding passive circuits 120a, 120b, and 120c. DC output terminals of the switching circuits 140a, 140b, 140c are electrically coupled to each other and configured to provide DC voltage Vdc.

Each of the switching circuits 140a, 140b, 140c respectively includes switches Q1a~Q4a, Q1b~Q4b, Q1c~Q4c configured to be selectively on or off. Similar to previous embodiments, take switches Q2a, Q2b, Q2c as an example, the switches Q2a, Q2b, Q2c are respectively electrically coupled to the second end of the inductance unit L1 and the first end of the inductance unit Lx1 (i.e., node Nsw1) in the corresponding passive circuits 120a, 120b, 120c. Before the switch Q2 is switched from off to on, the current passing through the inductance unit Lx1 is greater than the current passing through the inductance unit L1. Therefore, the passive circuits 120a, 120b, 120c may implement the zero voltage conduction of the switches Q2a, Q2b, and Q2c. It is noted that although switches Q2a~Q2c are taken as an example for illustration, but this disclosure is not limited by the example. In partial embodiments, the passive circuits 120a, 120b, 120c can be also configured to implement the zero voltage conduction of the switches Q1a~Q1c, Q3a~Q3c, or Q4a~Q4c.

In summary, the passive circuit 120 in this disclosure may be arranged in DC/DC power converters or DC/AC converters in single phase or multiphase (e.g., three phase) with various structures and realize the zero voltage switching of the transistor switch.

Figure 8A:
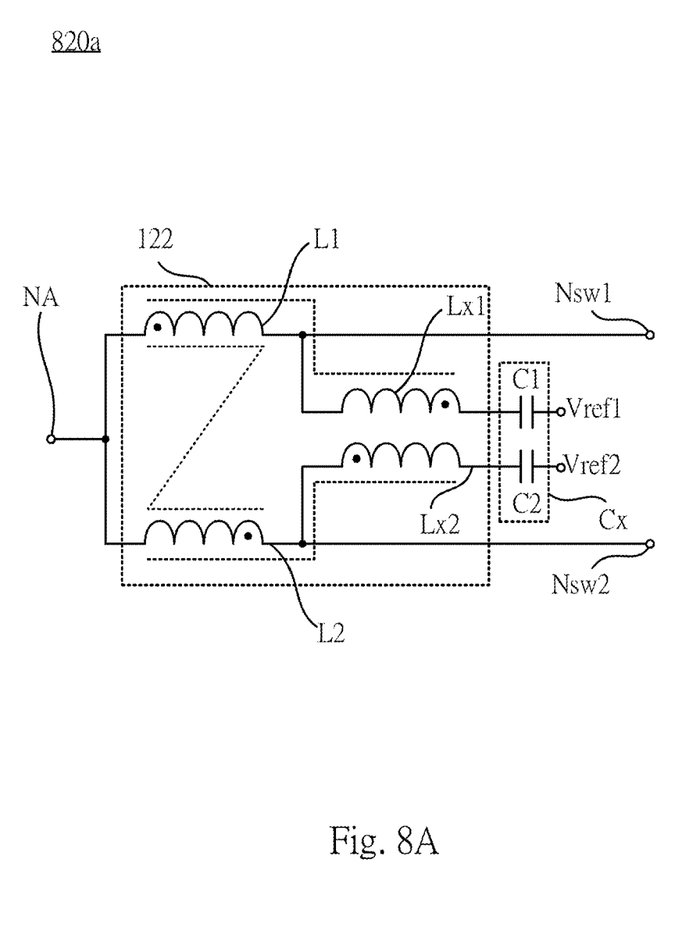
FIG. 8A and FIG. 8B are diagrams illustrating the passive circuit according to some other embodiments of the present disclosure.

Please refer to FIG. 8A and FIG. 8B. FIG. 8A and FIG. 8B are diagrams illustrating a passive circuit 820a, 820b according to some other embodiments of the present disclosure respectively. As shown in FIG. 8A, in some embodiments, the capacitance unit Cx includes a first capacitor C1 and a second capacitor C2. The first end of the first capacitor C1 is electrically coupled to the second end of the inductance unit Lx1, and the second end of the first capacitor C1 is configured to receive a reference voltage Vref1. The first end of the second capacitor C2 is electrically coupled to the second end of the inductance unit Lx2. The second end of the second capacitor C2 is configured to receive a reference voltage Vref2. In other words, in some embodiments, the first capacitor C1 and the second capacitor C2 may be respectively connected with different power sources and use different reference voltages Vref1, Vref2 to implement the operation of the capacitance unit Cx. Additionally, in some other embodiments, the second end of the first capacitor C1 and the second end of the second capacitor C2 may also be connected with each other and configured to receive the same reference voltage Vref. In other words, various circuit connections may be applied to the second end of the first capacitor C1 and the second end of the second capacitor C2.

Figure 8B:
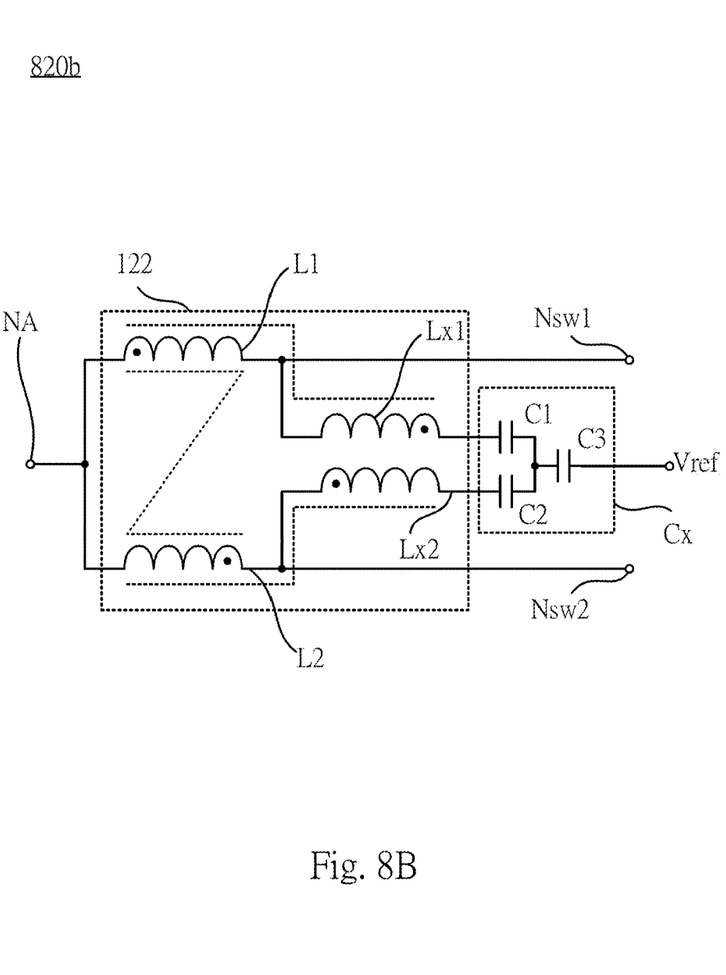

As shown in FIG. 8B, in some embodiments, the capacitance unit Cx may further include the third capacitor C3. The first end of the third capacitor C3 is electrically coupled to the second end of the first capacitor C1 and the second end of the second capacitor C2. The second end of the third capacitor C3 is configured to receive the reference voltage Vref. In addition, in some other embodiments, the capacitors C1, C2, C3 may be respectively implemented by one or more capacitors coupled in series or in parallel.

Figure 9:
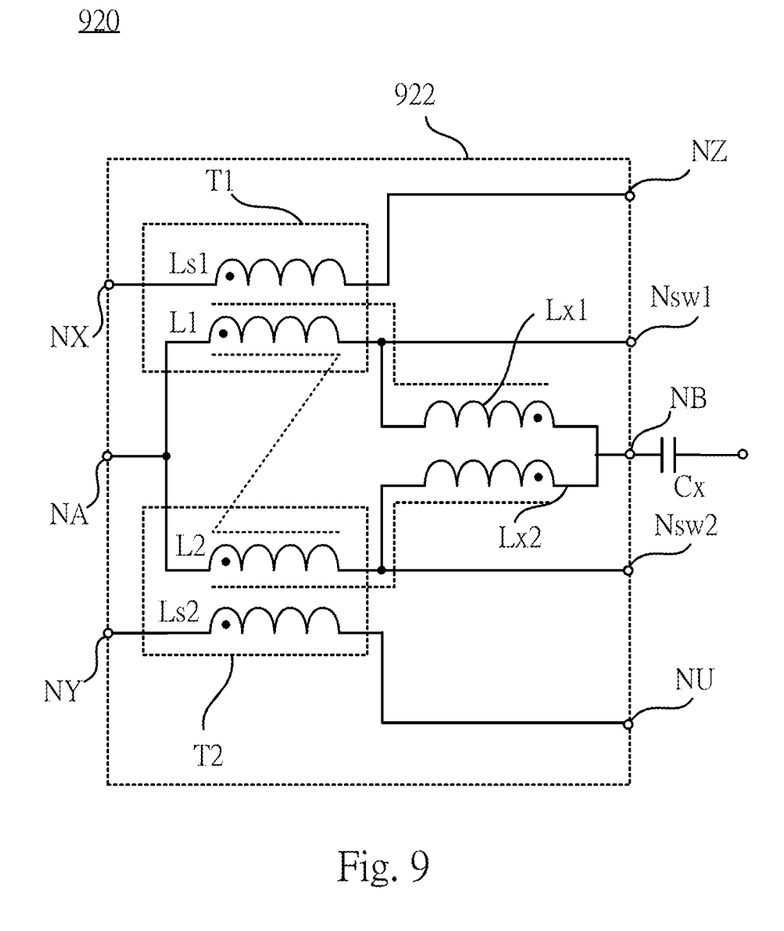
FIG. 9 is a diagram illustrating the passive circuit according to some other embodiments of the present disclosure.

Please refer to FIG. 9. FIG. 9 is a diagram illustrating the passive circuit 920 according to some other embodiments of the present disclosure. As shown in FIG. 9, in some embodiments, the inductive structure 922 in the passive circuit 920 may further include an isolation transformer T1 and an isolation transformer T2. The primary winding of the isolation transformer T1 includes the inductance unit L1. The secondary winding of the isolation transformer T1 includes the inductance unit Ls1. The primary winding of the isolation transformer T2 includes the inductance unit L2. The secondary winding of the isolation transformer T2 includes the inductance unit Ls2.

Specifically, the inductance unit Ls1 and the inductance unit Ls2 are respectively implemented with winding of magnetic posts commonly used by the inductance units L1 and L2 to implement the isolation transformers T1 and T2. By arranging the inductance unit Ls1 and the inductance unit Ls2, the passive circuit 920 may be further applied to isolated power converters.

Figure 10:
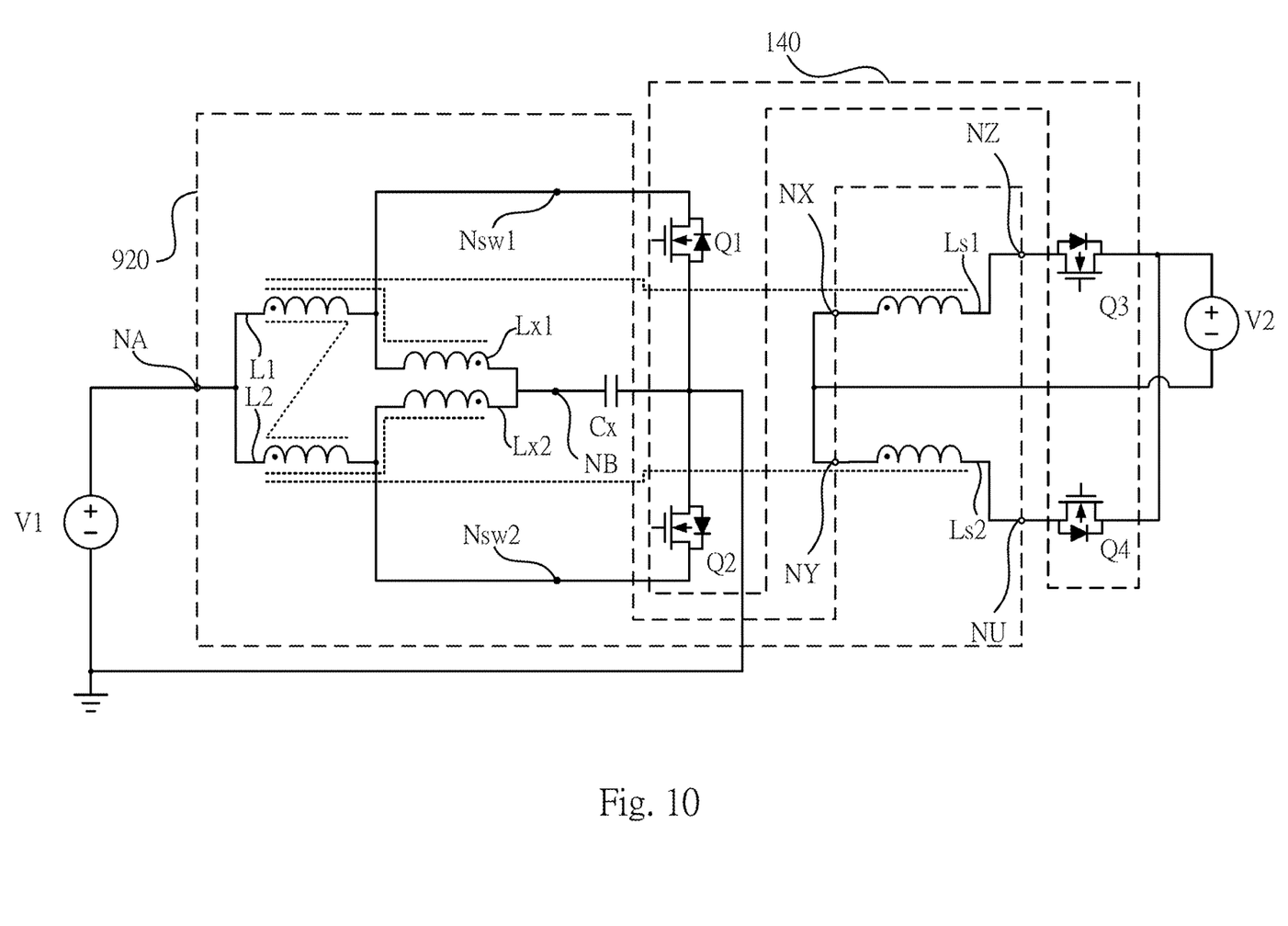
FIG. 10 is a diagram illustrating the converter including the passive circuit shown in FIG. 9 according to some embodiments of the present disclosure.

Please refer to FIG. 10. FIG. 10 is a diagram illustrating the converter 100 including the passive circuit 920 shown in FIG. 9 according to some embodiments of the present disclosure. For example, the power converter may be a flyback power converter. In the power converter 100 of the present embodiments, the switching circuits 140 includes the switches Q1~Q4.

A positive end of the DC voltage V1 is coupled to the node NA of the inductive structure 922. The first end of switch Q1 is electrically coupled to the second end of the inductance unit L1 (i.e., node Nsw1). The first end of switch Q2 is electrically coupled to the second end of the inductance unit L2 (i.e., node Nsw2). The second end of the switch Q1 is electrically coupled to the second end of the switch Q2, and commonly electrically coupled to the second end of the capacitance unit Cx and a negative end of the DC voltage V1.

The first end of the switch Q3 is coupled to the second end of the inductance unit Ls1 (i.e., node NZ). The first end of the switch Q4 is coupled to the second end of the inductance unit Ls2 (i.e., node NU). The second end of the switch Q3 and the second end of the switch Q4 are coupled to each other and to a positive end of the DC voltage V2. The first end NX of the inductance unit Ls1 and the first end NY of the inductance unit Ls2 are coupled to each other and to a negative end of the DC voltage V2.

Thus, the passive circuit 920 may form the isolated flyback power converter structure with the switching circuit 140. The isolation and conversion between the DC voltage V1 and the DC voltage V2 may be achieved by the inductance units L1, L2, Ls1, and Ls2.

In summary, in various embodiments of the present disclosure, the passive circuits 120, 820, 920 may be arranged in different power converter structures depending on the actual requirements to achieve the zero voltage switching of transistor switches. In addition, although the pole directions of the mutual coupling inductance units L1~L2, Lx1~Lx2, and Ls1~Ls2 are depicted in the drawings, the pole directions are simply examples. In other words, the pole direction of each of the inductance units L1~Ls2 in various embodiments may be modified with different requirements.

It is noted that, the drawings, the embodiments, and the features and circuits in the various embodiments may be combined with each other as long as no contradiction appears. The circuits illustrated in the drawings are merely examples and simplified for the simplicity and the ease of understanding, but not meant to limit the present disclosure.

In addition, those skilled in the art can understand that in various embodiments, circuit units may be implemented by different types of analog or digital circuits or by different chips having integrated circuits. Components may also be integrated in a single chip having integrated circuits. The description above is merely by examples and not meant to limit the present disclosure. Electrical components such as resistors, capacitors, inductors, diodes, transistor switches, and so on may be implemented by variously proper components. For instance, based on different requirements, the switches Q1~Q6 may be implemented by using MOSFETs (Metal-Oxide-Semiconductor Field-Effect Transistors), BJTs (Bipolar Junction Transistors), or any other types of transistors.

Although the disclosure has been described in considerable detail with reference to certain embodiments thereof, it will be understood that the embodiments are not intended to limit the disclosure. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A passive circuit, comprising:
a first inductance unit, a second inductance unit, a third inductance unit, a fourth inductance unit and a capacitance unit, wherein the first inductance unit, the second inductance unit, the third inductance unit, and the fourth inductance unit are magnetically coupled to each other,
and wherein a first end of the first inductance unit is electrically coupled to a first end of the second inductance unit; a second end of the first inductance unit is electrically coupled to a first end of the third inductance unit; a second end of the second inductance unit is electrically coupled with a first end of the fourth inductance unit; a second end of the third inductance unit and a second end of the fourth inductance unit are respectively electrically coupled with the capacitance unit; and the first end of the third inductance unit is not electrically coupled to the first end of the fourth inductance unit,
wherein the passive circuit further comprising a first isolation transformer and a second isolation transformer, wherein a primary winding of the first isolation transformer comprises the first inductance unit, a secondary winding of the first isolation transformer comprises a fifth inductance unit, a primary winding of the second isolation transformer comprises the second inductance unit, a secondary winding of the second isolation transformer comprises a sixth inductance unit, and the fifth inductance unit and the sixth inductance unit are magnetically coupled to each other.

2. The passive circuit of claim 1, wherein the first inductance unit, the second inductance unit, the third inductance unit, and the fourth inductance unit are integrated on a magnetic core.

3. The passive circuit of claim 1, wherein the capacitance unit comprises a first capacitor and a second capacitor, and wherein a first end of the first capacitor is electrically coupled to the second end of the third inductance unit; and a first end of the second capacitor is electrically coupled to the second end of the fourth inductance unit.

4. The passive circuit of claim 3, wherein the capacitance unit further comprises a third capacitor unit, and wherein a first end of the third capacitor unit is electrically coupled with the second end of the first capacitor and the second end of the second capacitor; and a second end of the third capacitor unit is configured to receive a reference voltage.

5. The passive circuit of claim 1, wherein the capacitance unit comprises a first capacitor; the second end of the third inductance unit and the second end of the fourth inductance unit are electrically coupled to each other; the second end of the third inductance unit and the second end of the fourth inductance unit are commonly electrically coupled to a first end of the first capacitor; and a second end of the first capacitor is configured to receive a reference voltage.

6. A power converter, comprising:
a passive circuit comprising a first inductance unit, a second inductance unit, a third inductance unit, a fourth inductance unit, and a capacitance unit, wherein the first inductance unit, the second inductance unit, the third inductance unit, and the fourth inductance unit are magnetically coupled to each other, wherein the capacitance unit is electrically coupled to the third inductance unit and the fourth inductance unit, wherein a first end of the first inductance unit is electrically coupled with a first end of the second inductance unit, a second end of the first inductance unit is electrically coupled with a first end of the third inductance unit, a second end of the second inductance unit is electrically coupled with a first end of the fourth inductance unit, the first end of the third inductance unit is not electrically coupled to the first end of the fourth inductance unit, a second end of the third inductance unit and a second end of the fourth inductance unit are respectively electrically coupled to the capacitance unit; and
a switching circuit electrically coupled to the passive circuit, wherein the switching circuit comprises a plurality of switches, configured to be on or off selectively to convert a first voltage to a second voltage,
wherein the switches comprise a first switch, and the first switch is electrically coupled to the second end of the first inductance unit and the first end of the third inductance unit, and wherein the power converter is configured to provide a passage for a current such that, before the first switch switches from off to on, the current which passes through the third inductance unit is greater than the current which passes the first inductance unit.

7. The power converter of claim 6, wherein the first end of the first inductance unit is configured to receive the first voltage, and the capacitance unit is configured to receive a reference voltage.

8. The power converter of claim 7, wherein the switches further comprise a second switch, a third switch and a fourth switch, wherein a first end of the first switch is electrically coupled to the second end of the first inductance unit, a second end of the first switch is electrically coupled to the reference voltage, a first end of the second switch is electrically coupled with the second end of the second inductance unit, a second end of the second switch is electrically coupled with the reference voltage, a first end of the third switch is electrically coupled with the first end of the first switch, a first end of the fourth switch is electrically coupled with the first end of the second switch, a second end of the third switch and a second end of the fourth switch are electrically coupled to each other, and configured to receive or provide the second voltage.

9. The power converter of claim 6, wherein the first inductance unit, the second inductance unit, the third inductance unit, and the fourth inductance unit are integrated on a magnetic core.

10. The power converter of claim 6, the passive circuit further comprises a first isolation transformer and a second isolation transformer, wherein a primary winding of the first isolation transformer comprises the first inductance unit, a secondary winding of the first isolation transformer comprises a fifth inductance unit, a primary winding of the second isolation transformer comprises the second inductance unit, a secondary winding of the second isolation transformer comprises a sixth inductance unit, a first end of the fifth inductance unit and a first end of the sixth inductance unit are electrically coupled to each other.

11. The power converter of claim 10, wherein the switches further comprise a first switch, a second switch, a third switch and a fourth switch, a first end of the first switch is electrically coupled to the second end of the first inductance unit, a second end of the first switch is electrically coupled to the capacitance unit, a first end of the second switch is electrically coupled with the second end of the second inductance unit, a second end of the second switch is electrically coupled with the second end of the first switch, a first end of the third switch is electrically coupled with a second end of the fifth inductance unit, a first end of the fourth switch is electrically coupled with a second end of the sixth inductance unit, a second end of the third switch and a second end of the fourth switch are electrically coupled with each other.

12. The power converter of claim 6, wherein the capacitance unit comprises a first capacitor and a second capacitor, a first end of the first capacitor is electrically coupled to the second end of the third inductance unit, a first end of the second capacitor is electrically coupled to the second end of the fourth inductance unit.

13. The power converter of claim 12, wherein the capacitance unit further comprises a third capacitor, a first end of the third capacitor is electrically coupled with the second end of the first capacitor and the second end of the second capacitor, a second end of the third capacitor is configured to receive a reference voltage.

14. The power converter of claim 6, wherein the capacitance unit comprises a first capacitor, the second end of the third inductance unit and the second end of the fourth inductance unit are electrically coupled with each other and commonly electrically coupled to a first end of the first capacitor, and a second end of the first capacitor is configured to receive a reference voltage.

15. The power converter of claim 6, wherein the switches comprise a first switch, a second switch, a third switch, a fourth switch, a fifth switch and a sixth switch, wherein a first end of the first switch, a first end of the third switch, a first end of the fifth switch are electrically coupled with each other, the second end of the first inductance unit is electrically coupled with a second end of the first switch and a first end of the second switch, the second end of the second inductance unit is electrically coupled with a second end of the third switch and a first end of the fourth switch, the second end of the third inductance unit and the second end of the fourth inductance unit are electrically coupled to each other and commonly electrically coupled to a first end of the capacitance unit, a second end of the capacitance unit is electrically coupled with a second end of the fifth switch and a first end of the sixth switch.

16. A power converter, comprising:
a plurality of passive circuits respectively configured to receive a corresponding one of a plurality of input ac phase voltages;
a plurality of switching circuits electrically coupled to a corresponding one of the passive circuits respectively; and
a plurality of DC output terminals of the switching circuits electrically coupled to each other,
wherein each of the passive circuits comprises a first inductance unit, a second inductance unit, a third inductance unit, a fourth inductance unit and a capacitance unit, wherein the first inductance unit, the second inductance unit, the third inductance unit, and the fourth inductance unit are magnetically coupled to each other, wherein the capacitance unit is electrically coupled to the third inductance unit and the fourth inductance unit, a first end of the first inductance unit electrically coupled with a first end of the second inductance unit, a second end of the first inductance unit electrically coupled with a first end of the third inductance unit, a second end of the second inductance unit electrically coupled with a first end of the fourth inductance unit, a second end of the third inductance unit and a second end of the fourth inductance unit respectively electrically coupled with the capacitance unit.

17. The power converter of claim 16, wherein the first inductance unit, the second inductance unit, the third inductance unit and the fourth inductance unit in the same passive circuit are integrated on a magnetic core.

18. The power converter of claim 16, wherein each of the switching circuits comprises a plurality of switches configured to be on or off selectively, and the switches comprise a first switch electrically coupled to the second end of the first inductance unit and the first end of the third inductance unit in the corresponding passive circuits, and wherein the power converter is configured to provide a passage for a current such that, before the first switch switches from off to on, the current which passes through the third inductance unit is greater than the current which passes the first inductance unit.

* * * * *